United States Patent

[11] 3,607,930

[72] Inventors Christoph Berding
 Limburgerhof, Pfalz;
 Paul Guenthert, Iggelheim, Pfalz;
 Waldemar Koehler, Ludwigshafen (Rhine);
 Gerhard Schulz, Ludwigshafen (Rhine), all
 of Germany
[21] Appl. No. 743,221
[22] Filed July 8, 1968
[45] Patented Sept. 21, 1971
[73] Assignee Badische Anilin- & Soda-Fabrik
 Aktiengesellschaft
 Ludwigshafen am Rhine, Germany

[54] CONTINUOUS PRODUCTION OF ALKALI METAL
 SALTS OF NITRILOTRIACETIC ACID
 4 Claims, 1 Drawing Fig.
[52] U.S. Cl...................................................... 260/534 E
[51] Int. Cl..................................................... C07c 101/20
[50] Field of Search......................................... 260/534 E

[56] References Cited
UNITED STATES PATENTS

| | | | |
|---|---|---|---|
| 2,631,165 | 3/1953 | Ploetz............................ | 260/534 E |
| 2,407,645 | 9/1946 | Bersworth..................... | 260/534 E |
| 3,419,609 | 12/1968 | Sibert............................ | 260/534 E |

OTHER REFERENCES

Groggins, Unit Processes in Organic Synthesis 5th Edition 1958; p. 448

Primary Examiner—Lewis Gotts
Assistant Examiner—Jacqueline L. Davison
Attorney—Marzall, Johnston, Cook & Root ABSTRACT: A continuous process for the production of alkali metal salts of nitrilotriacetic acid by reaction in a first stage of alkali metal cyanide, formaldehyde and excess ammonia at superatmospheric pressure and elevated temperature to form an aminoacetic acid solution, followed by depressurizing and treating the solution obtained with further amounts of alkali metal cyanide and formaldehyde while removing the ammonia formed until conversion to nitrilotriacetic acid is complete.

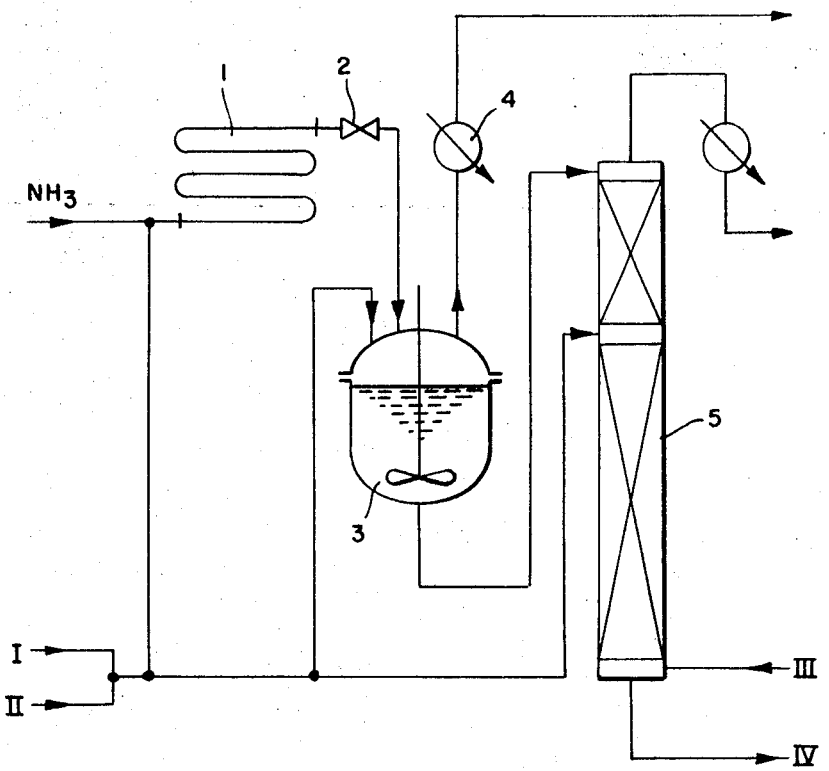

CONTINUOUS PRODUCTION OF ALKALI METAL SALTS OF NITRILOTRIACETIC ACID

The invention relates to a two-stage or multistage process for the production of alkali metal salts of nitriloacetic acid, the first stage being carried out under superatmospheric pressure and subsequent stages under atmospheric pressure.

It is known that alkali metal salts of nitrilotriacetic acid, e.g. the trisodium salt, can be manufactured in a batchwise manner by the condensation of ammonia with alkali metal cyanide and formaldehyde and simultaneous alkaline hydrolysis of the nitrile groups. To this end ammonia is admixed in alkaline aqueous solution with alkali metal cyanide or with stoichiometric amounts of alkali metal hydroxide and hydrocyanic acid, and formaldehyde is slowly added. Depending on the reaction conditions employed such as temperature, pressure, concentration, pH-value, and metering rates, the incompletely carboxymethylated byproducts iminodiacetic acid and aminoacetic acid, as well as other byproducts, e.g. hexamethylenetetramine, glycolic acid and formic acid, are formed.

This batchwise process has many disadvantages. One of them is that continuous servicing of the apparatus is necessary during the entire reaction, which takes several hours, in order to adjust the heat supply or refrigeration and at the same time the metering in of the starting materials to the continuously changing reaction conditions.

The quality of the product is subject to great variations, particularly as regards the content of the desired reaction product in the reaction solutions, the cyanide content, the formaldehyde content, the content of byproducts and secondary products, and the color of the solutions.

The reaction of ammonia, cyanide and formaldehyde to give nitrilotriacetic acid salts is a complicated system of reactions, which comprises several side reactions and secondary reactions, e.g. the hydrolysis of the cyanohydrin formed from sodium cyanide and formaldehyde to yield glycolic acid, and the reaction of the ammonia formed in the hydrolysis of the nitrile to the incompletely carboxymethylated amino acids. When complicated reaction systems with secondary reactions are carried out continuously, in general higher proportions of byproducts are obtained, and it appeared unlikely therefore that the quality of the product obtained would be improved by carrying out the process in a continuous manner.

It has been found surprisingly that alkali metal salts, in particular potassium salts and more especially sodium salts of nitrilotriacetic acid, can be obtained in good yields and high purity from alkali metal cyanide, formaldehyde and ammonia by continuous operation using a simple procedure, by carrying out the reaction in at least two stages, in the first stage alkali metal cyanide being reacted with formaldehyde in a stoichiometric ratio or approximately stoichiometric ratio, that is in a ratio that deviates by not more than 10 percent from the stoichiometric ratio, at temperatures of 50° C. to 200° C. and pressures of about 2 to 50 atmospheres gauge pressure in the presence of excess amounts of ammonia in a solution containing predominantly aminoacetic acid and the solution so obtained is treated, after bringing it to atmospheric pressure in a subsequent stage or several subsequent stages while simultaneously removing ammonia, with further quantities of alkali metal cyanide and formaldehyde at temperatures of 60° C. to 110° C. to convert the aminoacetic acid into nitrilotriacetic acid.

The reaction is advantageously carried out in at least two separate, and preferably in three separate, reaction vessels.

A suitable reaction vessel for the first stage is, for example, a pressure vessel with little backmixing, in particular a vessel in the form of a coil tube. Into this pressure vessel the components formaldehyde and alkali metal cyanide are introduced in stoichiometric or approximately stoichiometric amounts in a continuous manner, together with an excess of ammonia (e.g. 1 to 10 moles per mole of sodium cyanide), under a pressure which is less or equal to the saturation pressure, so that a homogeneous phase is constantly maintained and the formation of a gaseous phase is avoided. The reaction pressure in the first stage, that is the pressure at which ammonia is introduced, is from 2 to 50 atmospheres gauge and preferably from 6 to 25 atmospheres gauge. The reaction temperature is in the range of 50° C. to 200° C, preferably from 100° C. to 130° C. and the average residence time is generally from 10 minutes to 4 hours, and preferably from 20 minutes to 2 hours.

The formaldehyde used is advantageously used in the form of a commercial 20 to 40 percent aqueous solution, the alkali metal cyanide is potassium cyanide or, because of its cheapness, preferably sodium cyanide. The alkali metal cyanide can be added in solid form. It is however recommended to use the alkali metal cyanide in aqueous solution, because it is easier to meter. It is also possible to make use of technical grade alkali metal cyanide solutions which contain a slight excess of alkali. The alkali excess of the solution is not harmful to the reaction, on the other hand excess alkali need not be present, in contrast to known batchwise processes for carrying out the reaction.

At the exit of the reaction vessel of the first stage the reaction solution is brought to atmospheric pressure and, unless the pressure in the reaction vessel is maintained autogenously, part of the ammonia is recycled after having been compressed. The reaction solution is then kept at temperatures of 60° C. to 110° C., preferably 75° C. to 95° C., in one or more additional reaction vessels and further amounts of formaldehyde and alkali cyanide are added and ammonia which is still present in the solution or has been newly formed is removed, e.g. by bubbling nitrogen or steam through the solution. The reaction at atmospheric pressure can be carried out in one reaction vessel or preferably in several, particularly in two, separate units. For example a stirred vessel may be attached to the first stage, and there is introduced into this vessel preferably a gas, which is inert under the reaction conditions, in particular nitrogen or steam, and formaldehyde and alkali metal cyanide are added separately or admixed with one another in an amount which depends on the conversion achieved in the first stage, i.e. on the amount of mono- and disubstitution products present. Generally speaking the amount of formaldehyde and alkali metal cyanide added in the second stage per unit of time is 0.25 to 2 times the molar quantity of the quantity added in the first stage, with average residence times of, for example, 2 to 10 hours.

On account of the fact that at atmospheric pressure the conversion into nitrilotriacetic acid is not complete, i.e. the conversion is in general only 80 to 95 percent, it appeared advisable to add a further reaction stage to the process. A suitable reaction vessel is, for example, a packed or sieve plate column, a bubble cap tray or a valve tray column, into which steam is introduced countercurrently to the reaction solution in order to expel the remaining ammonia from the latter, and there is added a further small quantity, i.e. from 0.02 to 0.1 times the molar quantity of that added in the first and secondary stages, of formaldehyde and alkali metal cyanide, in order to bring about the complete conversion of any intermediate products still present to form nitrilotriacetic acid. The reaction temperature in this column is generally also from 60° C. to 110° C. with average residence times of, for example, 3 to 30 minutes. Oxygen or air can be added to the steam used for expelling the ammonia in the third reaction stage, resulting in the decoloration of the reaction solution.

It is furthermore possible to effect the reaction stages which follow upon the pressure stage in one apparatus, by using a column with a high return flow volume, e.g. a bubble cap tray column, into which formaldehyde and alkali metal cyanide can be introduced at one or more levels of the column, The process according to the invention yields a product of higher, uniform quality, which can be used without purification or subsequent treatment for industrial purposes. The yields obtained with this continuous process are considerably greater than those obtained in batchwise processes. In particular it has been possible to convert the intermediate compounds obtained in the reaction almost completely into the desired end product. The particular advantages of the process according to the invention are in the first place the high space-time yield and in the second place the high purity of the product. When using apparatus with the same effective content, the production capacity increases more than threefold with the new process. From the solution the alkali metal salt of nitrilotriacetic acid can be obtained as the monohydrate of high purity in an amount of over 98 percent by weight, corresponding to 92 percent by weight of the hydrate-water-free salt and 6 percent by weight of hydrate water, by evaporating or spray drying the solution.

The invention is illustrated by the following examples.

The parts and percentages given are by weight in the examples that follow.

EXAMPLE 1

One hundred seventy-five parts of a 28 percent sodium cyanide solution (I), 85 parts of a 36 percent formaldehyde solution (II) and 30 parts of ammonia are introduced per hour into a heated tubular reactor (1). The temperature in the tubular reactor is 100° C., the pressure is 20 atmospheres gauge and the average residence time is 30 minutes. The reaction mixture is passed continuously through a pressure release valve (2) into the stirred vessel (3) at atmospheric pressure. Into this stirred vessel there is introduced 87.5 parts of sodium cyanide solution (I) and 42.5 parts of formaldehyde solution (II) per hour. The temperature in the vessel (3) is 85° C., the average residence time is 6 hours. About 50 parts of ammonia is removed per hour via the reflux condenser (4). The reaction mixture which is withdrawn from the vessel (3) is passed continuously to the head of a bubble cap tray column (5) with 10 trays and is largely freed from ammonia with steam (III). In addition, a further 13.1 parts of sodium cyanide solution (I) and 6.4 parts of formaldehyde solution (II) are supplied to the seventh tray of the column. From the bottom of column (5) there are withdrawn per hour about 362 parts of the product solution (IV) containing 35.0 percent of the trisodium salt of nitrilotriacetic acid; this corresponds to a yield of 93.5 percent of the theory. In addition the solution contains 1.0 percent of the disodium salt of iminodiacetic acid and 0.3 percent of the sodium salt of aminoacetic acid, about 0.1 percent of formaldehyde in combined form (mainly hexamethylenetetramine) and less than 0.001 percent of sodium cyanide.

On evaporating the product solution (IV) to dryness a powder is obtained which at a water content of 2 percent contains 91 percent of the trisodium salt of nitrilotriacetic acid.

The space-time yield is 1.5 kg. of a product (calculated as 100 percent product) per liter of reaction space per day

EXAMPLE 2

This example describes the production of the potassium salt of nitrilotriacetic acid using the same apparatus and the same reaction conditions as in example 1. Per hour, 197 parts of a 33 percent potassium cyanide solution (I), 85 parts of a 36 percent formaldehyde solution (II) and 32.5 parts of ammonia are introduced into the tubular reactor (1), another 98.6 parts of potassium cyanide solution (I) and 42.5 parts of formaldehyde solution (II) are supplied to the stirred vessel (3), and a further 14.8 parts of potassium cyanide solution (I) and 6.4 parts of formaldehyde solution (II) are supplied to the seventh tray of column (5). About 32 parts of ammonia is removed per hour via the reflux condenser (4). About 398 parts per hour of product solution (IV) containing 37.4 percent of the tripotassium salt of nitrilotriacetic acid is withdrawn from the bottom of column (5); this corresponds to a yield of 92.7 percent of the theory. The solution also contains 1.3 percent of the dipotassium salt of iminodiacetic acid, 0.2 percent of the potassium salt of aminoacetic acid and less than 0.001 percent of potassium cyanide.

The dry product contains 90.5 percent of the tripotassium salt of nitrilotriacetic acid, its water content being 2 percent.

The following examples show the influence which the pressure of 10 and 2 atmospheres gauge in the first reaction stage has on the formation of nitrilotriacetic acid and of the intermediates iminodiacetic acid and aminoacetic acid in the various reaction stages.

EXAMPLE 3

The first and second stages of the reaction are carried out in two separate stirred vessels and the third stage in a bubble cap tray column with 10 trays (cf. example 1). The reaction conditions, the hourly amounts of starting materials supplied to the various reaction stages, and the amounts (in percent of the theory, with reference to the total amount of cyanide employed in the stage concerned and any preceding stages) of nitrilotriacetic acid, iminodiacetic acid and aminoacetic acid formed in the various stages are shown in the following table.

| Reaction stage | 1 | 2 | 3 |
| --- | --- | --- | --- |
| Pressure (atmospheres gauge) | 10 | 0 | 0 |
| Temperature (°C.) | 85 | 85 | 85 |
| Mean residence time (hours) | 2 | 6 | 0.33 |
| 28% sodium cyanide solution (parts per hour) | 50.0 | 45.0 | 5.0 |
| 36% formaldehyde solution (parts per hour) | 24.3 | 21.9 | 2.43 |
| Nitrilotriacetic acid (% of the theory) | 13.0 | 90.7 | 93.0 |
| I minodiacetic acid (% of the theory) | 19.0 | 4.3 | 2.6 143 |
| Aminoacetic acid (% of the theory) | 63.5 | 1.1 | 0.7 |

EXAMPLE 4

As in example 3, the first and second reaction stages are carried out in separate stirred vessels and the third in a bubble cap tray column with 10 trays. The following table contains the same kind of information as that in example 3, but for different reaction conditions.

| Reaction stage | 1 | 2 | 3 |
| --- | --- | --- | --- |
| Pressure (atmospheres gauge) | 2 | 0 | 0 |
| Temperature (°C.) | 85 | 85 | 85 |
| Mean residence time (hours) | 3.5 | 6 | 0.33 |
| 28% sodium cyanide solution (parts per hour) | 65.0 | 30.0 | 5.0 |
| 36% formaldehyde solution (parts per hour) | 31.6 | 14.6 | 2.43 |
| Nitrilotriacetic acid (% of the theory) | 37.5 | 91.2 | 93.5 |
| Iminodiacetic acid (% of the theory) | 41.0 | 4.7 | 2.8 |
| Aminoacetic acid (% of the theory) | 17.0 | 0.7 | 0.5 |

Examples 3 and 4 show that the composition of the reaction mixture in the first stage depends to a large degree on the pressure. At high pressures, e.g. 10 atmospheres gauge, the main product is aminoacetic acid; at low pressures, e.g. 2 atmospheres gauge, mainly iminodiacetic acid is formed. In the other two reaction stages these intermediates are largely converted into the end produce nitrilotriacetic acid so that the latter is obtained in a yield of 93 to 94 percent of the theory.

We claim:

1. A continuous process for the production of an alkali metal salt of nitrilotriacetic acid from alkali metal cyanide, formaldehyde and ammonia in at least two stages, which process comprises:

continuously introducing into a first stage reaction zone an alkali metal cyanide together with aqueous formaldehyde in a substantially stoichiometric ratio for reaction at a temperature of from 50° C. to 200° C. and a pressure of from 2 to 50 atmospheres in the presence of excess ammonia to form a solution which contains a mixture of products consisting predominantly of the alkali metal salts of aminoacetic acid and iminodiacetic acid;

continuously withdrawing said solution from said first stage reaction zone and depressurizing said solution to atmospheric pressure;

then continuously conducting said solution at a temperature of from 60° C. to 110° C. under atmospheric pressure through at least one additional stage of one or more separate reaction zones with further amounts of alkali metal cyanide and formaldehyde being continuously supplied to each separate reaction zone and with the ammonia formed being simultaneously removed at temperatures of from 60° C. to 110° C. until the conversion of said salts of aminoacetic acid and iminodiacetic acid to the corresponding alkali metal salt of nitrilotriacetic acid is substantially complete; and continuously withdrawing a solution of said alkali metal salt of nitrilotriacetic acid from the last reaction stage.

2. A process as claimed in claim 1 wherein aqueous alkali metal cyanide and aqueous formaldehyde in a ratio deviating no more than 10 percent from the stoichiometric ratio are conducted continuously through said first stage at 100° C. to 130° C. and under an ammonia pressure selected from the range of 6 to 25 atmospheres such that said ammonia pressure is always less than the saturation pressure of the solution.

3. A process as claimed in claim 2 wherein the solution withdrawn and depressurized from said first stage is continuously transferred to a second stage mixing zone maintained at about 75° C. to 95° C. and under atmospheric pressure while adding further alkali metal cyanide and formaldehyde in a 0.25 to twofold molar amount of the amount introduced in said first stage and continuously removing ammonia from said second stage, and continuously withdrawing the reaction mixture from said second stage and conducting it continuously downwardly at a temperature of 60° C. to 110° C. through a third stage reaction column in which there is introduced further alkali metal cyanide and formaldehyde in an added amount of 0.02 to 0.1 times the molar amount added in the two preceding stages while passing steam countercurrently through said column for removal of ammonia.

4. A process as claimed in claim 3 wherein steam or an inert gas is passed through the solution in said second stage mixing zone.

PO-1050
(5/69)

UNITED STATES PATENT OFFICE
CERTIFICATE OF CORRECTION

Patent No. 3,607,930          Dated September 21, 1971

Inventor(s) Christoph Berding et al

It is certified that error appears in the above-identified patent and that said Letters Patent are hereby corrected as shown below:

First page, left-hand column, insert below the line reading "Ludwigshafen am Rhine, Germany" the following:
-- [32] Priority July 12, 1967
   [33]          Germany
   [31]          P 16 43 232.9 --.

Column 3, line 51, "day" should read -- day. --.

Column 4, line 29, "2.6 143" should read -- 2.6 --.

Column 4, line 61, "produce" should read -- product --.

Signed and sealed this 11th day of April 1972.

(SEAL)
Attest:

EDWARD M. FLETCHER, JR.
Attesting Officer

ROBERT GOTTSCHALK
Commissioner of Patents